(12) United States Patent
Johnson et al.

(10) Patent No.: US 8,730,844 B2
(45) Date of Patent: May 20, 2014

(54) SELF-FORMING AD-HOC NETWORK SYSTEM (75) Inventors: Russell K. Johnson, Half Moon Bay, CA (US); Michael D'Ortenzio, Cupertino, CA (US); Keith Winnovich, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 107 days.

(21) Appl. No.: 13/067,507

(22) Filed: Jun. 6, 2011

(65) Prior Publication Data
US 2011/0255445 A1 Oct. 20, 2011

Related U.S. Application Data (63) Continuation of application No. 12/387,543, filed on May 4, 2009, now abandoned.

(51) Int. Cl.
*H04L 12/28* (2006.01)

(52) U.S. Cl.
USPC .......................................................... 370/255

(58) Field of Classification Search
None
See application file for complete search history.

(56) References Cited

U.S. PATENT DOCUMENTS

| | | | | |
|---|---|---|---|---|
| 5,235,615 | A * | 8/1993 | Omura ........................... | 370/342 |
| 7,903,601 | B2 * | 3/2011 | Voglewede et al. ........... | 370/324 |
| 2002/0039357 | A1 * | 4/2002 | Lipasti et al. ................. | 370/338 |
| 2004/0100929 | A1 * | 5/2004 | Garcia-Luna-Aceves .... | 370/338 |
| 2005/0153725 | A1 | 7/2005 | Naghian et al. | |
| 2005/0282494 | A1 * | 12/2005 | Kossi et al. ................... | 455/41.2 |
| 2006/0088018 | A1 * | 4/2006 | Black et al. ................... | 370/338 |
| 2007/0218874 | A1 | 9/2007 | Sinha et al. | |
| 2008/0046320 | A1 * | 2/2008 | Farkas et al. .................... | 705/14 |
| 2008/0232389 | A1 | 9/2008 | Wu et al. | |
| 2009/0252134 | A1 | 10/2009 | Schlicht et al. | |
| 2010/0094098 | A1 * | 4/2010 | Smith et al. ................... | 600/300 |
| 2010/0097969 | A1 * | 4/2010 | De Kimpe et al. ............ | 370/311 |
| 2010/0106961 | A1 * | 4/2010 | Pei et al. ....................... | 713/153 |

OTHER PUBLICATIONS

Buratti, C.; Verdone, R.; "A Hybrid Hierarchical Multi-Hop Wireless Network: From Wireless Sensors to Fixed Infrastructure", Mobile Adhoc and Sensor Systems, 2007. MASS 2007. IEEE International Conference on, vol., No., pp. 1-6, Oct. 8-11, 2007.*
Dec. 9, 2010 Office Action issued in U.S. Appl. No. 12/387,543.

* cited by examiner

*Primary Examiner* — Dang Ton
*Assistant Examiner* — Ronald H Davis
(74) *Attorney, Agent, or Firm* — Oblon, Spivak, McClelland, Maier & Neustadt, L.L.P.

(57) ABSTRACT

Disclosed are a self-forming ad-hoc network architecture and triplet-based radio waveform for communicating via the network architecture. The self-forming ad-hoc network preferably has a plurality of network nodes including a point-of-presence node, one or more relay nodes that aggregate data (triplet) traffic, one or more sensor nodes that send and receive data from relay nodes, and one or more handheld nodes that send and receive data to and from relay nodes and communicate data between themselves. The communication waveform is defined by orthogonal triplets having multiple time slots, multiple frequency channels, and multiple hop sequences in a channel, that is used to communicate between the network nodes.

18 Claims, 6 Drawing Sheets

Fig. 7

SELF-FORMING AD-HOC NETWORK SYSTEM

This is a Continuation of application Ser. No. 12/387,543 filed May 4, 2009. The disclosure of the prior application is hereby incorporated by reference herein in its entirety.

BACKGROUND

The present invention relates generally to networks, and more particularly to a self-forming ad-hoc network architecture and associated triplet-based radio waveform.

There are numerous star networks, such as cell phone networks, that are currently in use. However, none of these existing networks implement an ad-hoc mesh network for deployment where there is no infrastructure. Such an ad-hoc network would be useful for military applications and in disaster relief situations.

For example, tactical military engagements are most often located within a 20 to 100 square mile area, and major disasters affect areas of this size. In battleground and disaster situations, it is necessary to have an available communication network that allows personnel to communicate with one another. In military situations, no communication infrastructure exists in tactical areas. In disaster situations, the communication infrastructure may be compromised by the disaster.

Thus, it would be advantageous to have a communication network architecture that can be deployed in military and disaster situations, and the like, where no useable communication infrastructure exists. It would be advantageous to have a communication network architecture that is self-forming and does not require an existing infrastructure. It would also be advantageous to have a communication network architecture that allows short burst text messaging and audio communication between nodes using either uni-cast or multi-cast addressing, and also allows reachback to the Internet. It would also be advantageous to have a communication network architecture that is covert, secure, authenticated, and is easy to deploy. It would also be advantageous to have a triplet-based radio waveform that may be used to implement a self-forming ad-hoc network architecture.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Disclosed is an exemplary self-forming, ad-hoc radio frequency (RF) communication system or mesh network architecture, or network, that does not require an existing infrastructure. The communication system or mesh network architecture allows short burst text messaging and audio communication between nodes using uni-cast or multi-cast addressing, and allows communication via the Internet. The communication system or mesh network architecture is covert, secure, authenticated, and is easy to deploy.

Figure 1:
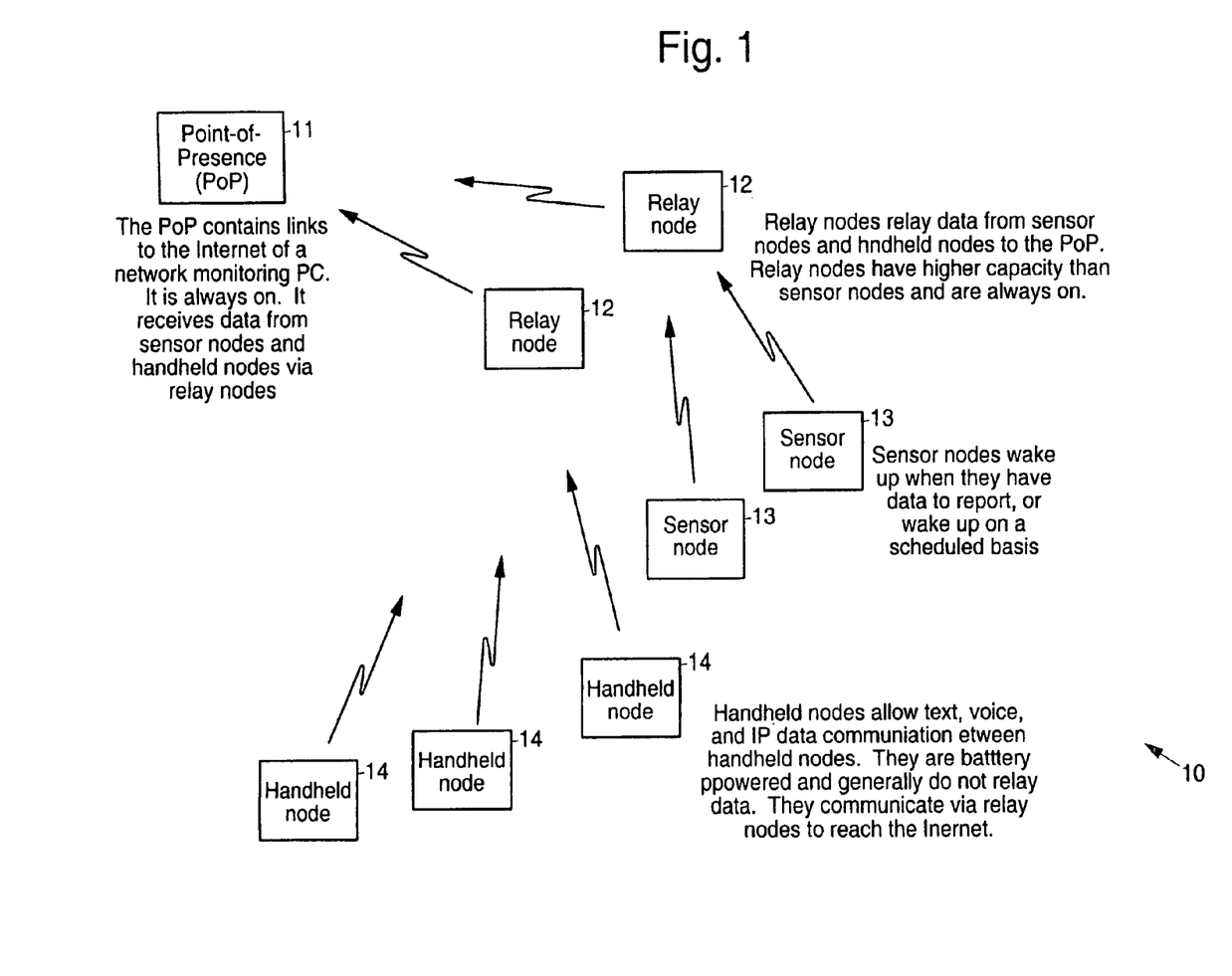
FIG. 1 illustrates an exemplary four-tier, self-forming, ad-hoc communication system architecture.

Referring to the drawing figures, FIG. 1 illustrates an exemplary four-tier, ad-hoc communication system architecture 10 and shows exemplary nodes employed to implement the architecture 10. The exemplary communication system architecture 10 may be rapidly deployed, is IP enabled, is self forming, has long endurance, has a simple infrastructure, and is relatively low in cost. As is shown in FIG. 1, the exemplary system architecture 10 has four tiers comprising different node types, which include (1) point-of-presence (PoP) nodes 11, (2) relay nodes 12, (3) handheld nodes 13, and (4) sensor nodes 14.

The self-forming ad-hoc system architecture 10 addresses the need for an inexpensive, small size, weight, and power (SwaP), long endurance, rapid setup, high quality of service (QoS), minimal infrastructure, connection oriented and connectionless data transport, that is covert, secure, authenticated, and forms an IP enabled sensor relay reach-back and personal IP communication system for use in metropolitan-size environments. The self-forming ad-hoc network system architecture 10 is capable of simultaneously providing communications to monitor hundreds of places and persons of interest within a metropolitan-size operating environment and allow short burst text messaging and audio communication between nodes using either uni-cast or multi-cast addressing mode, and also allow reachback to the Internet.

The waveform used in the architecture 10 is an ad-hoc mesh networking waveform, and is based on a sophisticated frequency hopped TDMA/FDMA modulation scheme, making it difficult to detect and intercept. The sophisticated frequency hopping nature of the ad-hoc mesh networking waveform truly makes it appear absent.

Each communication node of the system architecture 10 is capable of data rates of at least 100-kbps and enable QoS that range from real-time reliable transport to best effort traffic. The communication system architecture 10 allows real-time monitoring of potentially hundreds of sensors over a metropolitan-size area with appropriate QoS. The communication system architecture 10 allows operation control units (such as a PC interface or PDA) located at a field headquarters (HQ) or control from remote locations via the Internet. The communication system architecture 10 supports sensor reach-back through other gateway devices, e.g., interfaces to local wireless communications systems such as rapidly deployable pico-size WCDMA systems. The self forming network architecture 10 covers a metropolitan-size area with only a handful of radios, i.e., the four types of nodes 11, 12, 13, 14, yet allow hundreds of sensor nodes to report back simultaneously. A backbone comprising fewer than 10 relay nodes 12 allows coverage of an area of at least 20 square miles. Each radio has a maximum range of at least 7-miles at 100-kbps or greater.

The system architecture 10 is IP enabled, and provides automatic service discovery, node discovery, uni-cast communication, and multi-cast user group communication, multi-cast group join, and multi-cast group leave. The system architecture 10 automatically finds routes from sensor nodes 13 through the backbone to the point-of-presence node 11 or to another sensor node 13. Conversely, the system architecture 10 automatically finds routes from the PoP node 11 through the backbone to sensor nodes 13. The communication waveform utilized in the architecture 10 exhibits low probability of intercept and low probability of detection (LPI/LPD) characteristics.

At its highest level, the system architecture 10 supports fully automatic reach-back of IP (Ipv6) sensor data over a metropolitan-size tactical area (ideally 100-square miles, 20-square miles minimum) with a minimal set (minimum 10) of radios (nodes 11, 12, 13, 14). The system architecture 10 also supports uni-cast and multi-cast group IP voice and text communication to users within the tactical network and reachback to the Internet. The radios (nodes 11, 12, 13, 14) are very low cost and have a small size, weight, and power (SwaP). Supported data rates extend up to at least 100-kbps for sensor nodes 13, and into the Mbps range for relay nodes, 12, and support both connection oriented and connectionless communication and QoS ranging from real-time reliable to best effort reliable.

The system architecture 10 is capable of communicating with up to several hundred sensor nodes 13 simultaneously in real-time with appropriate QoS over a metropolitan-size coverage area and relay their data or communication messages. Supported packet destinations include a PoP to the Internet or internal destinations within the network. The network architecture 10 is preferably formed within an Ipv6 address space. Internally, the system architecture 10 utilizes 16-bit sub-net addressing. Only the 16-bit sub-net address is used for local addressing within the network architecture 10. When interfacing with the Internet, the PoP 11 appends the full Ipv6 network address.

As was mentioned above, the system architecture 10 comprises four tiers of node types: point-of-presence (PoP) nodes 11, relay nodes 12, handheld nodes 13, and sensor nodes 14.

The sensor nodes 14 are extremely low power nodes that "wake up" whenever they have sensor data to relay, connect to the network and establish a route and are allocated bandwidth and time slots, send their IP datagrams, tear down the connection (bandwidth and time slot allocation), and go back to sleep. Sensor nodes 14 generally operate using batteries (although they may be powered by external means, such as by solar power).

Handheld nodes 13 enable text, voice and data communication between handheld nodes 13 and reachback to the Internet through relay nodes 12 to the PoP node 11. Handheld nodes 13 can configure themselves to allow relay of sensor traffic or not (user selectable). Handheld nodes 13 are generally battery powered, and their default state is to not allow relay of sensor traffic, which saves handheld node power and extends its battery life.

Relay nodes 12 are generally positioned in favorable locations to allow long range communication (up to 7 miles or more). Relay nodes 12 are placed near power sources and are powered by 120 volt sources, for example, or other external means. Relay nodes 12 are "always on" and their job is to relay traffic to other nodes in the system architecture 10, particularly traffic from sensor nodes 14 to the Internet point-of-presence (PoP) node 11. Relay nodes 12 can have data capacities up to 19.2-Mbps, and this large capacity is necessary to aggregate traffic and transmit it to the PoP node 11.

Point-of-presence (PoP) nodes 11 are host gateways that connect to the Internet and allow reachback of sensor data. They are externally powered devices and are always "on."

Sensor nodes 13 are designed to be very low power and generally sleep at all times (to conserve battery power) except when they have data to send (push), which may occur at random intervals or at scheduled communication times (push or pull). If a continuous power source is available, sensor nodes 13 may be powered at all times. However, most sensor nodes are normally battery and/or solar powered.

Sensor nodes 13 are capable of communication at nominal rates of 120-kbps and can advertise the services they offer to other nodes of the network. Sensor nodes 13 connect to relay nodes 12 to transfer data. Relay nodes 12 are "always on" nodes that usually relay data from sensor nodes 13 along a relay "backbone" 12 to the point-of-presence (PoP) nodes 11. Relay nodes 12 support data throughputs of up to 19.2-Mbps. Point-of-presence (PoP) nodes 11 comprise gateways to the Internet. Point-of-presence (PoP) nodes 11 are "single-homed," meaning that the network only has one entry point to the Internet or externally managed network.

The exemplary architecture has 10 channels, with each channel having a bandwidth of 2.6 MHz. The total system bandwidth is 26 MHz. Each channel has 4.0 TDMA time slots, each with a 25 msec duration.

The transmitted digital constellation is QPSK with a bandwidth efficiency of about 2 bits/second/hertz. The architecture 10 preferably utilizes twenty orthogonal frequency hopping sub-channels in each 2.6-MHz band, along with 40 time slots. This provides an architecture 10 that allows provisioning of bandwidth/time/channel triplets for multiple bearers (i.e., nodes 11, 12, 13, 14) to allow signaled reservation of bandwidth and communication data rate. This prevents mutual interference between nodes, allows provisioning multiple bearers with on-demand bandwidth, makes optimum use of system bandwidth, and ensures high quality of service (QoS) since no multi-hop self-interference occurs.

Frequency Hopped TDM/FDMA Modulation (FH-TDMA/FDMA) and Triplets

Figure 2:
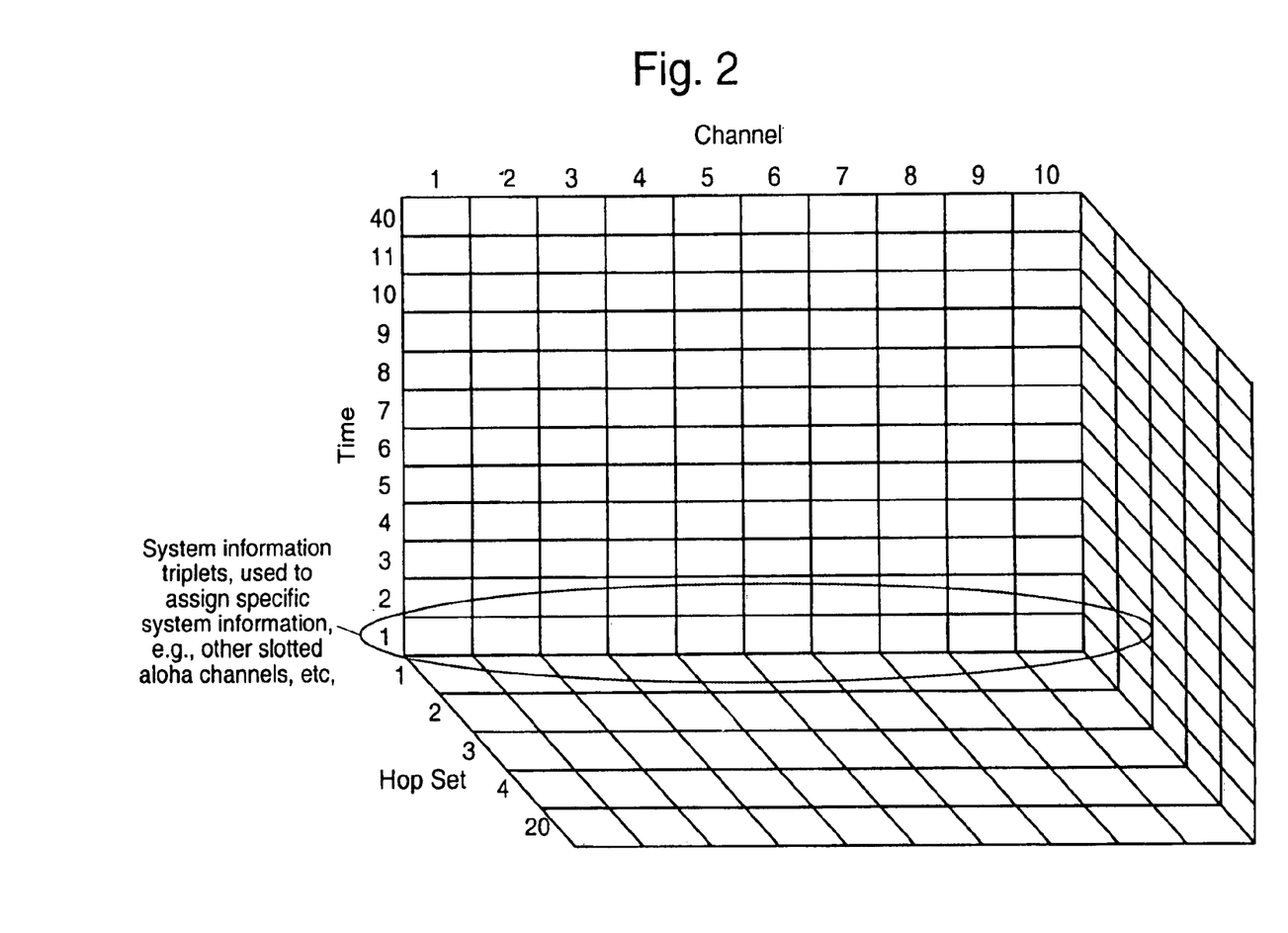
FIG. 2 illustrates an orthogonal signaling scheme for use in the self-forming, ad-hoc communication system architecture.

Presented below are details of the air interface (physical layer, PHY) and Medium Access Control (MAC layers), which provide a robust modulation scheme for the ad-hoc self-forming mesh network architecture 10. FIG. 2 illustrates an orthogonal signaling scheme (frequency hopped TDMA/FDMA modulation) for use in the self-forming, ad-hoc communication system architecture 10.

Coordinates of a block represent time_slot/hop_set/channel triplets. Triplets are demand-assigned to create guaranteed orthogonality between signals allocated dynamically and slotted aloha signals used for common access. FIG. 2 shows a hypothetical assignment of time_slot/hop_set/channel triplets to users. Triplets are assigned to avoid self interference over the multiple hops to the destination.

The hardware is modular, and it supports ISM band operation over a subset of triplets with a maximum output power of 1-Watt, or full operation over all triplets in other bands where it is allowed.

The total bandwidth of the architecture 10 is 26-MHz. This is divided into ten 2.6-MHz channels. Each channel is further divided into 20 frequency hopped sub-channels. Different frequency hopped sub-channels are used to communicate between adjacent nodes to ensure orthogonal communication. This prevents co-channel interference between adjacent nodes, and thus ensure high QoS. TDMA time slots within each frequency hopped sub-channel are also used to give orthogonal access to many nodes within a FDMA sub-channel and prevent co-channel interference between nodes on the same FDMA channel. Triplets (time slot/channel/sub-channel) are demand-assigned when a communication reservation is made based on the requested communication data rate, user priority, and other system traffic commitments. A reservation protocol (RSVP) is utilized to demand-assign time slot/frequency channel/hop set (triplet) assignments on each segment of the communication path. Triplets are released when a node terminates a communication session.

Each frequency hopped sub-channel is configured with 4.0 time slots per frame. Each time slot epoch is 0.025-seconds in duration (40 hops per second), and frame epochs occur every 1-second. The architecture 10 is configured with 10 frequency channels, each with a bandwidth of 2.6-MHz. In each bandwidth there are 20 orthogonal frequency hopping sub-channels, each with an instantaneous bandwidth of 130-kHz. There are a total of 8000 time_slot/channel/hop_set triplets available in the system architecture 10 (10 channels, 40 time slots per channel, 20 hop-sets per channel). This is depicted in FIG. 2, where the horizontal axis represents the 10 channels, the vertical axis represents the 40 time slots, and the third orthogonal axis represents the 20 orthogonal frequency hopping sets. The basic modulation is multichannel frequency hopped TDMA/FDMA (FH-FDMA/TDMA).

One or many time_slot/channel/hop_set triplets can be demand-assigned exclusively to a bearer signal depending on its bandwidth needs during the reservation process to provide dynamic demand-assigned guaranteed service. Time slot/channel/hop_set triplets may also be declared "slotted aloha" access to provide common signaling channels that can be used by any node 11, 12, 13, 14 without a reservation. That is, triplets can be demand-assigned as guaranteed (exclusive to a bearer signal) or triplets can offer slotted aloha service (used for system information or non-reserved communication, i.e., slotted aloha time triplets are shared between many nodes 11, 12, 13, 14 simultaneously).

Each triplet is 0.025-seconds in duration and has a bandwidth of 130-kHz. Triplets support an instantaneous data rate of 130-kbps (assumes QPSK modulation and rate ½ turbo coding), and an average data rate of 2400-bits (2.4-kbps plus 850-bps overhead). Multiple triplets are assigned to higher speed bearer signals to provide sufficient throughput. There are a total of 8000 triplets (10*40*20), so the aggregate data rate through the network architecture 10 is 19.2-Mbps. Triplets are assigned is such a way at each node 11, 12, 13, 14 that no self interference occurs as the signal traverses the multiple hop link to its destination. Triplets are also assigned such that a node 11, 12, 13, 14 never simultaneously transmits and receives. Thus, at any give time epoch, the node 11, 12, 13, 14 is either transmitting on triplets, or it is receiving on triplets; but never both simultaneously. That is, all nodes 11, 12, 13, 14 either transmit on all triplets over a time epoch or receive over a time epoch. This architecture 10 circumvents the need for complex front-end diplexers and guard bands between channels.

Sensor nodes 13 can transmit at rates ranging from 19.2-Mbps (all 8000 triplets) to as low as 2.4-kbps (one triplet) depending on their capabilities and the resource limitations, i.e., other traffic, constraints of the system. Low rates of communication are ideal for low power sensors, high communication rates are ideal for sending large data files quickly to the PoP 11 or other destination.

Relay nodes 12 and PoP nodes 11 may implement a subset of triplets, or, a fully capable node 11, 12 (all 8000 triplets delivering up to 19.2-Mbps) implements all triplets. Low cost sensor nodes 13 only implement a subset of the triplets (e.g., all 40 time slots, 1 frequency hopped sub-channel, and only one channel), which reduces their required transmit power and reduces their cost (they may also be used for ISM band compliance). Nodes 11, 12, 13, 14 operating in ISM bands by law cannot transmit more than 1-Watt (900 MHz ISM band, and 2.4-GHz ISM band). Nodes 11, 12, 13, 14 operating in other bands may transmit more power and have the option of implementing all triplets to achieve up to 19.2-Mbps.

The hardware may be implemented in slices (by channel). This allows modular configurations to be built from the multiple instances of the same silicon micro chip. Sensor nodes 13 only implement a few channels to meet low cost requirements, high throughput relay 12 and PoP nodes 11 implement all channels. However, all nodes 11, 12, 13, 14 are built from the same ASIC slice. This allows all nodes 11, 12, 13, 14 (low power sensor nodes 13, and powerful relay nodes 12) to be built from the same ASIC building block, drastically reducing nonrecurring engineering (NRE) costs.

The RSVP signaling scheme and the use of triplets allows each node 11, 12, 13, 14 to avoid the use of any triplet that experiences interference; either intentional (jamming) or unintentional (accidental). The waveform automatically detects and avoids the use of blocked or jammed frequencies.

Data Frame Timing

All nodes in the architecture 10 are synchronized so that they have common knowledge of time slot start and stop times. All data frames transmitted within triplets have timing source bits (TSB) bits indicating whether their timing is (1) directly tied to Global Positioning System (GPS) timing, or (2) indirectly tied to GPS timing through the reception of type (I) frames. Relay nodes 12 and PoP nodes 11 are synchronized directly to GPS time, and their transmitted timing source bits (TSBs) are set to indicate direct GPS timing. One or more pre-defined triplets each frame are dedicated to transmitting system information (SI) data from relay nodes 12 and its timing source bit is set to indicate type 1 frames (directly tied to GPS timing). These frames allow type 2 nodes (e.g., sensor nodes 13) in its coverage area to time synchronize indirectly to the relay node 12 by simply synchronizing to the received type (1) frame timing. Sensor nodes 13 generally do not have GPS units and indirectly derive their timing/synchronization by receiving data frames from relay nodes 12. Their transmitted timing source bits (TSBs) are set to indicate type (2) timing (system timing indirectly derived from type 1 data frames). Type 2 nodes are potentially offset somewhat from true GPS time due to propagation delays between type 1 nodes and type 2 nodes. The system architecture 10 incorporates enough timing guard to allow for this.

Radio enclaves that are not receiving either relay node transmissions or PoP node transmissions are not tied to the network architecture 10 and asynchronously synchronize between themselves. However, their timing is relative to their enclave and not tied to any universal time reference.

System Information Triplets

Figure 3:
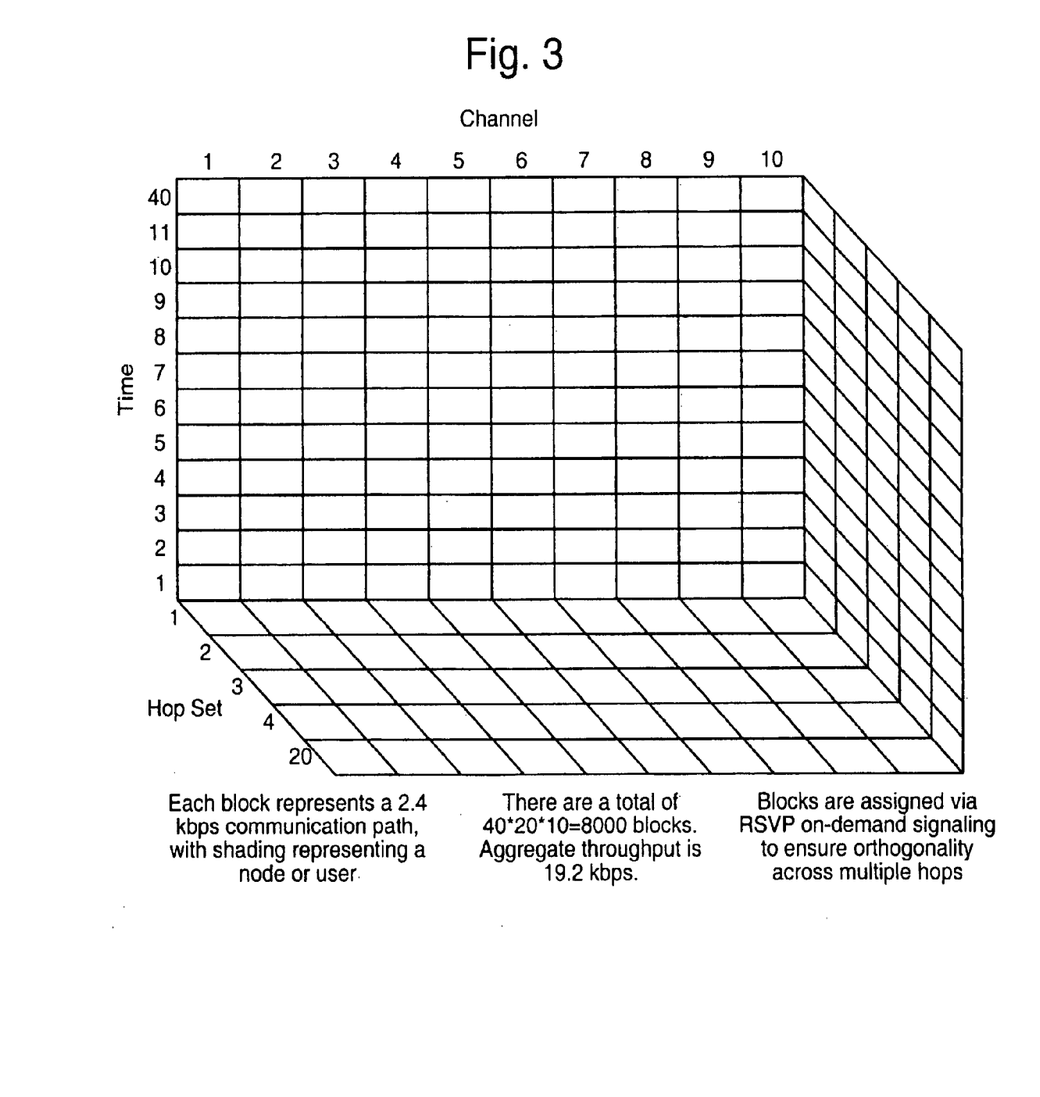
FIG. 3 illustrates exemplary system information triplets, which are used to distribute system information and assign slots.

FIG. 3 shows system information triplets, which are used to distribute system information. System information common channel (SICC) triplets are pre-assigned slotted aloha, shared slots, and always reside at hop-set 1, time slot 1 for each of the 10 channels. The system information triplets relay system information, such as relay nodes that have been detected and control triplets assigned to specific relay nodes 12. Sensor nodes 13 first listen to the system information common channel (SICC) and obtain system information data to learn about the system configuration, i.e., detected relay nodes 12, and assigned triplets. Sensor nodes 13 can then send and receive messages to/from specific relay nodes 12 and orderwire triplets (e.g. RSVP) via the information obtained over the system information common channel and its associated triplets.

RSVP Reservations

Figure 4:
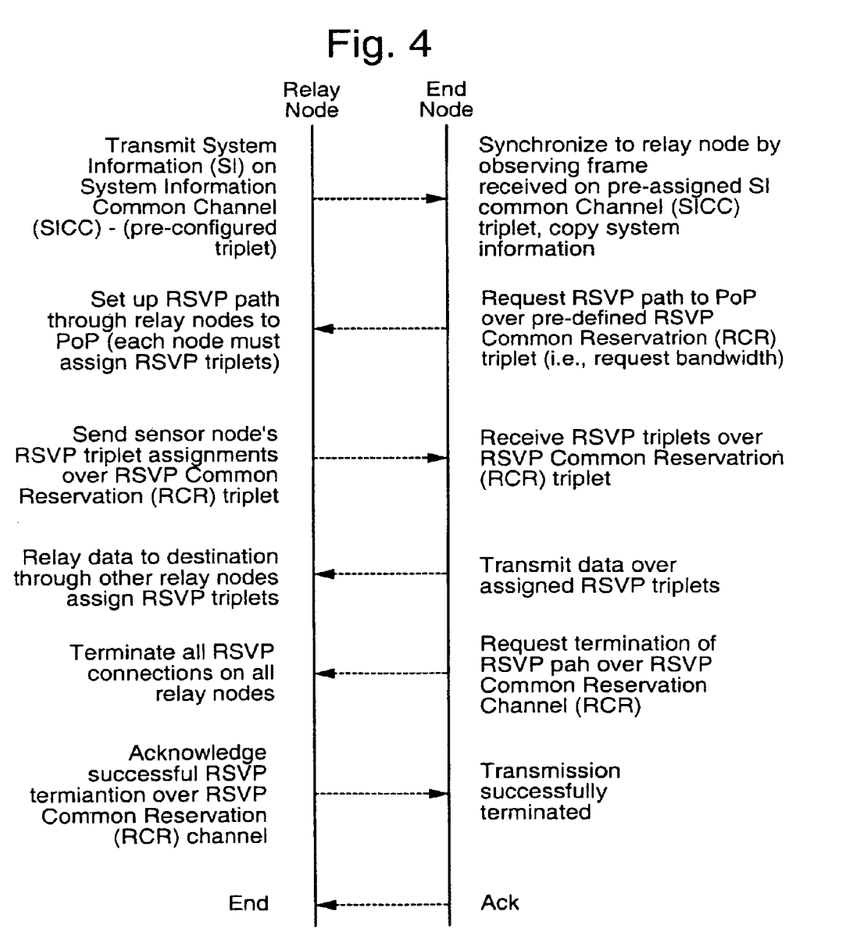
FIG. 4 illustrates RSVP connection set-up, data transmission, and RSVP tear-down.

FIG. 4 illustrates RSVP connection set-up, data transmission, and RSVP tear-down, and also illustrates RSVP transmission of data to the PoP 11 or other destination. FIG. 4 shows a method used by a sensor node 13 to set up a demand-assigned guaranteed triplet RSVP RF communication path to a destination node.

RSVP paths ensure that no other signal, internal (a bearer's own multi-hop communication or another bearer signal) or external signal to the system architecture 10 (e.g., jammer or inadvertent rogue signal), will interfere with the transmission, even if multiple hops (and thus multiple transmissions over the system architecture 10) are required to reach the final destination. RSVP triplets are chosen by relay nodes 12 to ensure that no interference is present (due to RF interference from other cooperative nodes relaying the user's data, unintentional interference from unknown sources, or jamming sources).

First, relay nodes 12 are periodically transmitting system information (SI) on the system information common channel (SICC); this data is transmitted by relay nodes 12 every 5 seconds. The system information common channel (SICC) is a set of guaranteed (no other interference from other relay nodes 12) set of triplets used to send system information. The sensor node 13 derives GPS timing from the framing and timing of triplets associated with SICC triplet. The sensor node 13 receives system messages over the system information common channel, such as the RSVP common reservation (RCR) triplet, this slotted aloha triplet is used for requesting bandwidth and receiving return messages from the relay node 12.

The sensor node 13 requests bandwidth (demand-assigned) over the RSVP common reservation (RCR) triplet (slotted aloha, shared triplet defined in the system information). The relay node 12 receives the bandwidth request from the sensor node 13 and polls its neighbors to determine which triplets are available and coordinates triplet usage to ensure that no system self interference occurs along the multi-hop path to the destination. The relay node 12 then assigns an appropriate number of triplets to the sensor node 13 to accommodate its bandwidth request. Each triplet supports a data throughput of 2.4-kbps, so N triplets will be assigned, where N*2.4 kbps is greater than or equal to the requested bandwidth. Node priority and system congestion are considered by the relay node 12 when assigning triplets. It is possible that the relay node 12 cannot accommodate the full bandwidth requested by the sensor node 13.

The sensor node 13 may then begin transmission of data on the RSVP triplets assigned to it. The RSVP triplets are torn down when they are no longer required by the sensor node 13. A teardown message is sent over the RSVP common reservation (RCR) triplet (slotted aloha, shared). The relay node 12 tears down all RSVP triplets on all relay nodes to the destination and acknowledges the teardown to the sensor node 13.

Retrieve Neighbor Triplet Usage Table (TUT)

Figure 5:
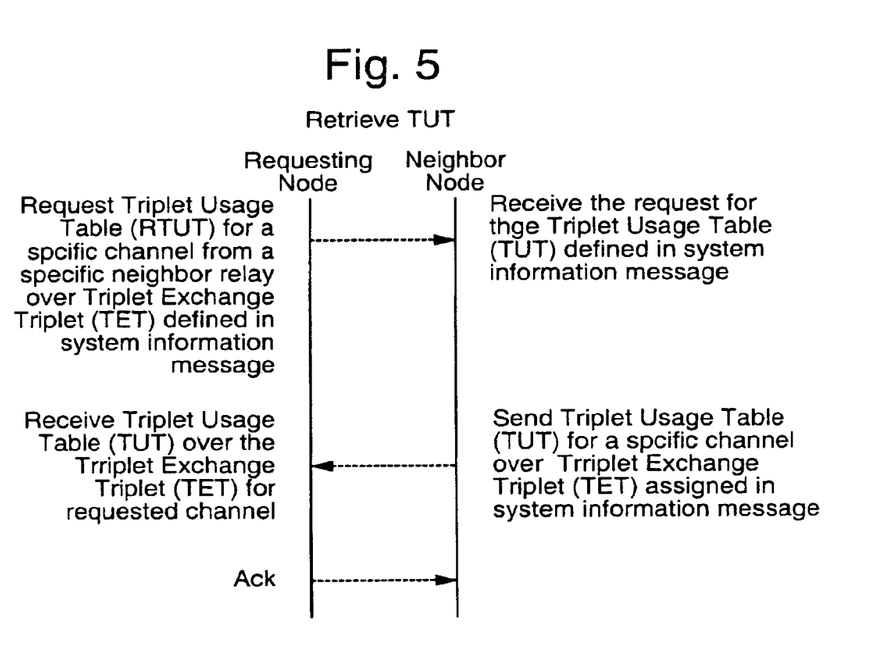
FIG. 5 illustrates an exemplary retrieve neighbor triplet usage table (TUT) flow diagram.

Each relay node 12 must retrieve its neighbor's triplet usage table (TUT) in order to assign non-interfering triplets to new RSVP bandwidth requests. Only neighbor relay nodes 12 within a single hop need report their usage tables since only those (reachable) neighbor relay nodes 12 can interfere with a relay node 12 and vice-versa. FIG. 5 shows the sequence diagram for retrieving a neighbor's triplet usage table. The relay node 12 requests a specific neighbor relay node's 12 triplet usage table by sending a request triplet usage table (RTUT) message on the triplet exchange triplet (defined in the system information message). The RTUT addresses a specific neighbor relay node 12. Neighbor relay nodes 12 and associated addresses are discovered through by neighbor discovery (discussed below). The neighbor relay node 12 responds by sending the specific triplet usage table (TUT) over the triplet exchange triplet. The requesting relay node 12 acknowledges receipt of the table. The requesting relay node 12 can then determine which triplets do not interfere with communications within its reachable radius; these triplets can be assigned for new RSVP bandwidth requests.

Neighbor Discovery

Figure 6:
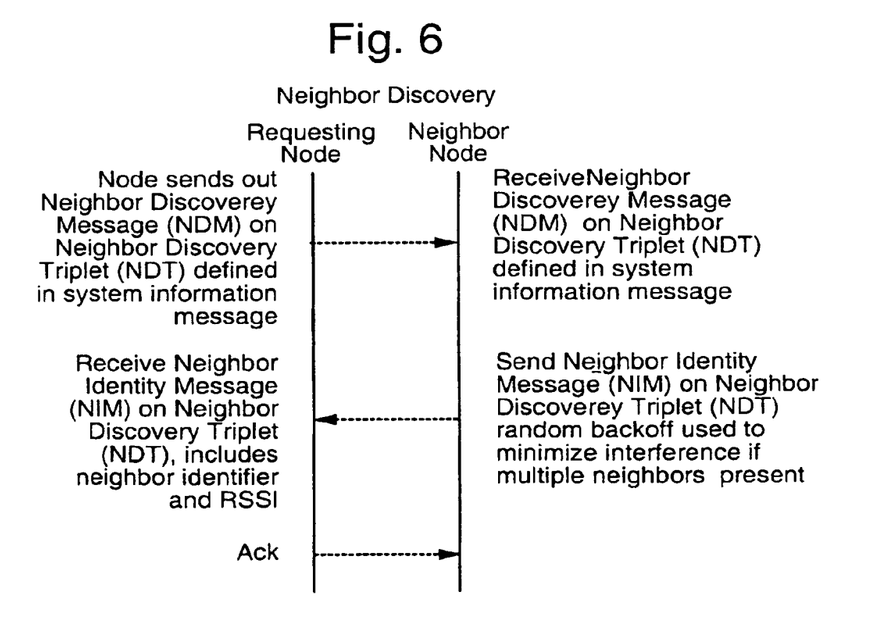
FIG. 6 illustrates an exemplary neighbor discovery flow diagram.

Knowledge of neighbor node addresses and RSSIs is required for RSVP signaling and ad-hoc on-demand distance vector (AODV) routing. A neighbor relay node 12 discovery sequence diagram is shown in FIG. 6. A requesting relay node 12 sends out a neighbor discovery message (NDM) on the neighbor discovery triplet (NDT, defined in the system information message). Neighbor relay nodes 12 receive the neighbor discovery message and respond with their neighbor information message (NIM) on the shared neighbor discovery triplet (NDT) defined in the system information message. The neighbor information message (NIM) includes the neighbor node's 12 unique IP address. The NIM is acknowledged by the requesting node 12. If the NIM is not received within a timeout period, an exponential backoff timer is started and the NIM is repeated after timer expiration.

Ad-Hoc On-Demand Distance Vector (AODV) Routing

Figure 7:
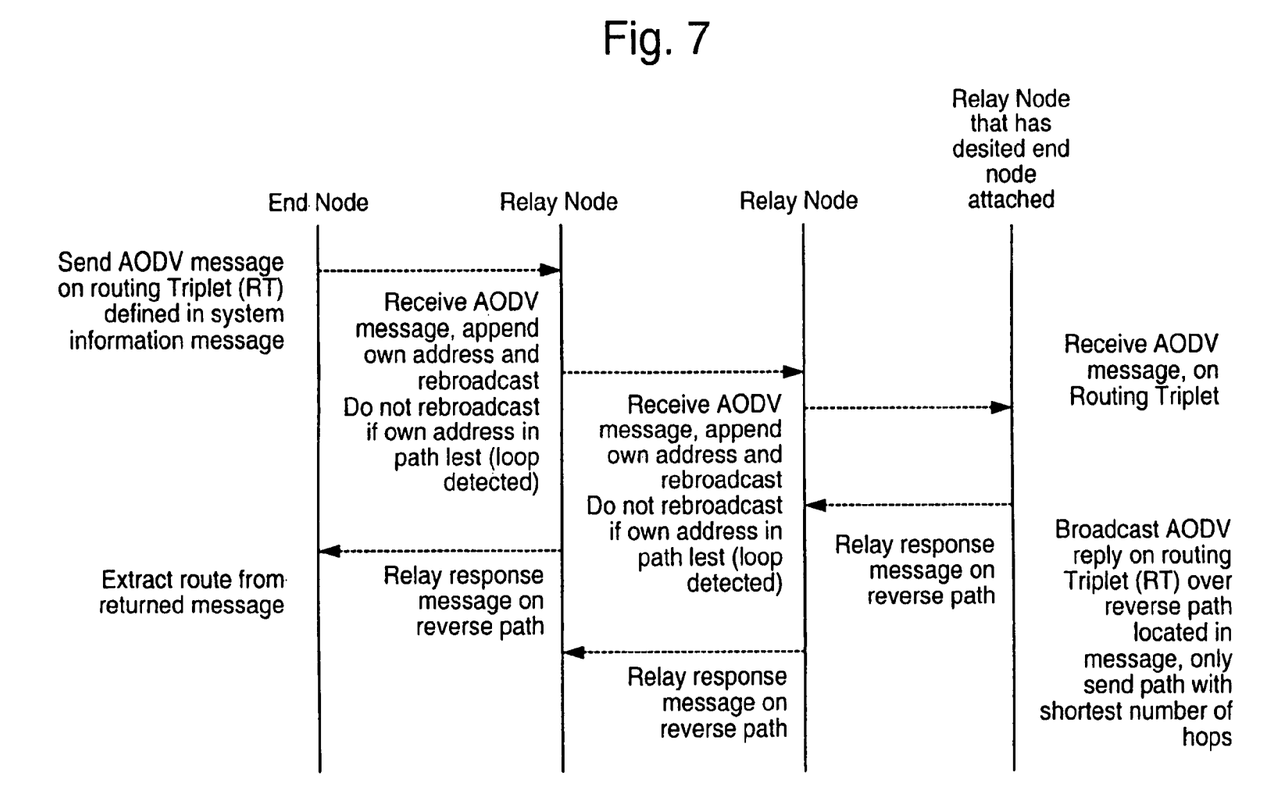
FIG. 7 illustrates exemplary ad-hoc, on-demand, distance vector (AODV) routing.

FIG. 7 illustrates ad-hoc on-demand distance vector (AODV) routing. The architecture 10 uses ad-hoc on-demand distance vector (AODV) routing between relay nodes. It is assumed that in most installations 10 or fewer relay nodes 12 will be used. A different, more scalable routing algorithm may be used if more than 10 relay nodes are present, e.g., open shortest path first (OSPF). The advantage of ad-hoc on-demand distance vector (AODV) routing is its simplicity. It is assumed that all sensor nodes 13 register with relay nodes 12 so that routing is essentially between relay nodes 12, i.e., from source to relay nodes 12, through relay nodes 12, to the destination. If the route to the destination only includes one relay node 12, then a direct transmission without the need of the relay node 12 may be tried.

Ad-hoc on-demand distance vector routing (AODV) begins with the source node 13, 14 sending a routing message on the routing triplet (RT) defined in the system information message, which is a slotted aloha triplet that is shared among all nodes 11, 12, 13, 14. Any relay node 12 that receives the routing message examines the intended destination address. If the destination is itself, or any sensor node 13 registered with it, it sends back a reply with its own address appended to a route TLV (type, length, value) field and the destination address if the destination address is registered with it. The reply follows the reverse route in the route field.

If the receiving node 12 is not the destination nor the destination of any sensor node 13 registered to it, then it rebroadcasts the routing message, except if any of the addresses in the route TLV (type, length, value) field are its own address it drops the message (a loop has been detected). It rebroadcasts the message on the routing triplet with its own address appended to the route TLV field.

Internet Protocol (IP) Architecture

The system architecture 10 is allocated a 16-bit IPv6 subnet block of addresses by the PoP 11. Internally, the system architecture 10 utilizes a 16-bit sub-net addressing. Only the 16-bit subnet address is used for local addressing within the network architecture 10. When interfacing with the Internet, the PoP 11 appends the full IPv6 network address. This completely circumvents the necessity of network address translation (NAT, RFC 3022) often used in IPv4 solutions.

Each node 11, 12, 13, 14 is capable of advertising its services to the network architecture 10, e.g., vehicle tracking node 14, video node 14, photo node 14, industrial monitoring node 14, PoP node 11, relay node 12, handheld radio node 14, etc.

Each sensor node 13 is capable of automatically finding the shortest path to a backbone relay node 12. Each backbone relay node 12 is capable of finding the shortest path to a PoP node 11 or destination node through other backbone relay nodes 12.

Each node 11, 12, 13, 14 is capable of supporting RSVP demand assigned triplet reservations for each hop from the source node (e.g., a sensor node 13) to the destination node (e.g., a PoP node 11). The RSVP setup determines (1) the shortest route from the sensor node 13 to the backbone relay node 12, and (2) the shortest path from the backbone relay node 12 through other backbone relay nodes 12 to the PoP 11 or final destination, and (3) assigning one or many triplets for each hop from source to destination in such a manner as to avoid co-channel interference.

The RSVP algorithm considers all bearer information sent by each node 11, 12, 13, 14 in the RSVP chain or adjacent RSVP chains to avoid self interference between any of the bearer signals along the RSVP path.

Thus, a self-forming ad-hoc network architecture and triplet-based radio waveform have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. A communication network, comprising:
  a self-forming ad-hoc network including a plurality of distinct network nodes, each of the distinct network nodes configured to communicate with other nodes over one of 8000 triplets, each triplet being defined by dividing a total bandwidth of the each of the distinct network nodes, 26 MHz, is divided into ten 2.6 MHz channels that are further divided into 20 frequency hopped sub-channels, each of the sub-channels further divided into 40 time slots, to provide the 8000 triplets, wherein the distinct network nodes include at least two distinct types of nodes built from a same silicon micro chip, a first type of the at least two distinct types of nodes implementing a first number of channel slices, and a second type of the at least two distinct types of nodes implementing a second number or channel slices that is less than the first number of channel slices.

2. The communication network recited in claim 1 wherein triplet usage signals are automatically exchanged between the distinct network nodes to make orthogonal, non-interfering triplet assignments to bearer signals.

3. The communication network recited in claim 1 wherein each triplet corresponds to an orthogonal guaranteed data rate.

4. The communication network recited in claim 1 wherein triplets are automatically torn down when no longer needed and other network nodes are informed of a change in network status resulting from the torn down triplets.

5. The communication network recited in claim 1 wherein triplets are processed to automatically discover neighbor nodes among the distinct network nodes.

6. The communication network recited in claim 1 wherein triplets are processed to automatically discover routes between the network nodes of the self-forming ad-hoc network.

7. The communication network recited in claim 1 wherein the triplets support voice communication, text messaging, file transfer, and communication over an Internet.

8. The communication network recited in claim 1 wherein the plurality of distinct network nodes comprise a point-of-presence node, one or more relay nodes that aggregate data traffic, one or more sensor nodes that send and receive data from relay nodes, and one or more handheld nodes that send and receive data to and from relay nodes and communicate data between the handheld nodes.

9. The communication network recited in claim 1 wherein the distinct network nodes carry IPv6 or Ipv4 Internet protocol traffic.

10. The communication network recited in claim 1 wherein the distinct network nodes support uni-cast and multi-cast Ipv4 or IPv6 Internet communication protocols.

11. The communication network recited in claim 1 wherein the triplets are automatically assigned to a new bearer signal along a route to be taken by the new bearer signal.

12. The communication network recited in claim 1 wherein the triplets are assigned to a bearer signal to ensure non-interference in a radio spectrum between a multi-hop transmission of the bearer signal, and other bearer signals communicated over the self-forming ad-hoc network.

13. The communication network recited in claim 1 wherein the triplets are automatically assigned as slotted aloha or assigned exclusively to bearer signals.

14. The communication network recited in claim 1 wherein the triplets are processed to detect and avoid measured in-band interference, either intentional or unintentional, and the triplets are modified to avoid interfering frequencies.

15. The communication network recited in claim 1 wherein the triplets are processed to dynamically define slotted aloha control channels over a system information triplet.

16. The communication network recited in claim 1 which comprises a reservation protocol to demand-assign triplet assignments on each hop of a communication path between the distinct network nodes.

17. The communication network recited in claim 1 wherein the triplets are orthogonal triplets.

18. A communication network, comprising:
  a self-forming ad-hoc network having a plurality of network nodes including:
    a point-of-presence node that is always on and configured to interface with Internet;
    a plurality of relay nodes that are always on and configured to aggregate data traffic;
    a plurality of sensor nodes configured to sleep at all times and wake up only when the sensor nodes have data to transmit to the relay nodes; and
    a plurality of handheld nodes configured to enable and disable the handheld nodes to function as one of the relay nodes to send and receive data to and from the relay nodes and communicate data between the handheld nodes, wherein each of the network nodes configured to communicate with other nodes over one of triplets, each triplet being defined by dividing a total bandwidth of the each of the network nodes into a number of channels that are further divided into a number of sub-channels, wherein the number of channels are divided into the number of sub-channels by frequency hopping.

* * * * *